United States Patent [19]

Fischer et al.

[11] Patent Number: 5,306,431
[45] Date of Patent: Apr. 26, 1994

[54] PROCESS FOR AUTOMATICALLY CONTROLLABLE REDUCTION OF THE NITRITE CONTENT OF NITRITE-CONTAINING AQUEOUS SOLUTIONS TO VALUES BELOW 1 MG/1

[75] Inventors: Joachim Fischer, Rodenbach; Hubert Wolf, Hammersbach; Klaus Stuetzel, Frankfurt am Main; Friedhelm Brandner, Gelnhausen; Manfred Diehl, Frankfurt am Main, all of Fed. Rep. of Germany

[73] Assignee: Degussa Aktiengesselschaft, Frankfurt am Main, Fed. Rep. of Germany

[21] Appl. No.: 925,749

[22] Filed: Aug. 7, 1992

[30] Foreign Application Priority Data

Aug. 23, 1991 [DE] Fed. Rep. of Germany ....... 4127980

[51] Int. Cl.$^5$ ................................................ C02F 1/72
[52] U.S. Cl. ...................................... 210/746; 210/759
[58] Field of Search ...................... 210/743, 746, 759

[56] References Cited

U.S. PATENT DOCUMENTS

| | | | |
|---|---|---|---|
| 4,268,397 | 5/1981 | Horie et al. | 210/746 |
| 4,416,786 | 11/1983 | Knorre et al. | 210/908 |
| 4,968,436 | 11/1990 | Gutekunst et al. | 210/743 |

FOREIGN PATENT DOCUMENTS

| | | |
|---|---|---|
| 0267166 | 11/1988 | European Pat. Off. . |
| 2930442 | 2/1902 | Fed. Rep. of Germany . |
| 2852475 | 5/1980 | Fed. Rep. of Germany . |
| 3125452 | 9/1985 | Fed. Rep. of Germany . |
| 2027004 | 2/1980 | United Kingdom . |

OTHER PUBLICATIONS

World Patents Index Latest, Week 8125, Derwent Publications Ltd., Class A, AN 81-45424 and SU 767,147.

*Primary Examiner*—Neil McCarthy
*Attorney, Agent, or Firm*—Beveridge, DeGrandi, Weilacher & Young

[57] ABSTRACT

Reduction of the nitrite content of aqueous solutions by treatment with hydrogen peroxide in the acidic pH range can be controlled by measurement of the redox potential. Contrary to the teaching of the prior art, addition of the hydrogen peroxide in the process according to the invention is terminated not at the highest redox potential, but only after lowering of the potential to a value of 650±10 mV. In this way, nitrite contents below 1 mg/l can be obtained even when the solutions additionally contain fluctuating amounts of various compounds oxidizable by $H_2O_2$.

9 Claims, No Drawings

PROCESS FOR AUTOMATICALLY CONTROLLABLE REDUCTION OF THE NITRITE CONTENT OF NITRITE-CONTAINING AQUEOUS SOLUTIONS TO VALUES BELOW 1 MG/1

BACKGROUND AND INTRODUCTION

The present invention relates to a process for the automatically controllable reduction of the nitrite content of nitrite-containing aqueous solutions, more particularly wastewaters and pickling acids, to values below 1 mg $NO_2^-/l$ by treatment of the solutions at a pH value below 3.5 with hydrogen peroxide of which the addition is controlled by the redox potential. The process according to the present invention also encompasses the treatment of nitrite-containing aqueous solutions which, in addition to nitrite, contain other compounds oxidizable by hydrogen peroxide.

An automatically controllable process for detoxifying wastewaters containing nitrite ions, in which the nitrite ions are oxidized with hydrogen peroxide to nitrate ions in the mildly acidic pH range, is known from DE-PS 28 52 475 (U.S. Pat. No. 4,280,914). In this process, the reduction in the pH value during oxidation is used to control the input of $H_2O_2$. This process is suitable for detoxification by batch methods, but not for the treatment of large wastewater streams with fluctuating contents of various ingredients oxidizable with $H_2O_2$ by continuous methods.

EP-A-0 267 166 describes a process for the reduction of $NO_X$ gas from a nitric acid solution containing "dissolved $NO_X$" by treatment of the solution with hydrogen peroxide, the quantity of hydrogen peroxide added being controlled depending upon the redox potential. FIG. 1 of that document shows the redox potential curve as a function of the "dissolved $NO_X$" content which comprises nitrous acid, $N_2O_3$, NO and $NO_2$. It can be seen that the redox potential increases with decreasing content of dissolved $NO_X$, reaching a maximum of +855 mV on complete oxidation, i.e. at an $NO_X$ content of zero. When more $H_2O_2$ is added, the redox potential of the solution containing excess $H_2O_2$ falls to +650 mV.

Contrary to the teaching of EP-A 0 267 166, it has now been found that nitrite-containing wastewater treated with hydrogen peroxide by the process according to that document is not free from nitrous acid at the maximum redox potential, which is in the order of +850±30 mV depending on the acid concentration, so that nitrite remains in the waste-water after neutralization and leads to environmental pollution. This process fails completely unless sufficient iron (II) ions are present in addition to nitrite ions in the solution to be treated. In this case, the initial potential is itself +850 mV so that, under the known control regime, no $H_2O_2$ at all would be added and, hence, no detoxification would occur.

SUMMARY OF THE INVENTION

One object of the present invention is to modify the process known from EP-A 0 267 166 to the extent that it could generally be used for the treatment of nitrite-containing aqueous solutions, i.e. including those which additionally contain fluctuating amounts of various compounds oxidizable by $H_2O_2$, such as for example $Fe^{2+}$ and sulfur compounds having low oxidation numbers. A nitrite content below 1 mg $NO_2^-/l$ would be safely obtained.

According to the present invention, this and other objectives are achieved by a process for the automatic controllable reduction of the nitrite content of nitrite-containing aqueous solutions, which may additionally contain other compounds oxidizable by hydrogen peroxide in varying amounts, to values below 1 mg $NO_2^-/l$. Hydrogen peroxide is added continuously or in portions to the nitrite-containing aqueous solutions (having a pH value below 3.5). Termination of the addition of hydrogen peroxide is dependent upon the continuously measured redox potential, such that addition of the hydrogen peroxide is terminated not at the highest redox potential but only after lowering of the potential to a value of 650±10 mV.

DETAILED DESCRIPTION OF THE INVENTION

With a knowledge of EP-A-0 267 166, it could not have been expected that nitrite would still not be completely oxidized to nitrate at the point of highest redox potential, but instead only after lowering of the redox potential to a value of 650±10 mV by addition of more hydrogen peroxide. Accordingly, the end point of the addition of hydrogen peroxide is reached in the so-called "control direction reducing agent addition" (=lowering of the redox potential). For automatically controlling the oxidative treatment of the wastewater, the redox potential is continuously measured by standard measuring instruments and the metering unit, generally a metering pump, is actuated via an automatic controller (all of such instruments are known in the art); coming from relatively high potential values, the addition of $H_2O_2$ is terminated when the set value of 650±10 mV is reached.

Known redox controllers with P (=proportional) PI (=proportional-integral), PID (=proportional-integral-differential) behavior may be used to actuate the metering unit for the addition of hydrogen peroxide as and when required. The hydrogen peroxide is added in the form of an aqueous solution of any concentration, preferably with a concentration of 30 to 70% by weight $H_2O_2$. An MP (memory-programmable) control system, known in the art, may also be used.

Nitrite is not directly oxidized to nitrate, instead oxidation only occurs at pH values below 3.5. At such pH values, nitrous acid rather than the nitrite ion is present in equilibrium with oxides of nitrogen. Accordingly, the "nitrite content" of the solutions to be detoxified also includes $HNO_2$, $N_2O_3$, NO and $NO_2$. The nitrite content is determined by known methods (e.g., colorimetrically with sulfanilic acid and anthranilic acid).

The redox potential is determined using measuring electrodes which are inert to the acidic conditions. The electrodes are preferably noble metal electrodes and, more preferably, platinum electrodes. Suitable reference electrodes are, for example, calomel, silver chloride and thalamid electrodes, calomel electrodes being preferred. Such electrodes are known in the art.

As already mentioned, the oxidative treatment of the nitrite-containing aqueous solutions takes place at pH values below 3.5. If the solution to be treated has an initial pH value above 3.5, it is adjusted to a pH value below 3.5 before the treatment, for example by addition of a mineral acid. Acidic pickling solutions containing nitric acid and hydrofluoric acid, for example of the type used in the pickling of stainless steel, can be directly subjected to the treatment according to the present invention to reduce their nitrite content.

In one preferred embodiment, the redox potential is measured at a substantially constant pH value of 2.5±0.2. In cases such as this, a small measuring stream is best continuously branched off from the reactor for treating the nitrite-containing aqueous solution. A pH value of 2.5±0.2 is maintained in this measuring stream by addition of acids or bases and the redox potential is determined at that pH value while a pH value below 3.5 is adjusted in the reactor itself. It is possible in this way to save lye for back-neutralization of the solution freed from nitrite. The process according to the present invention may be carried out both by the batch process and the continuous process.

If the nitrite-containing aqueous solution to be treated contains other compounds oxidizable by hydrogen peroxide in addition to nitrite or nitrous acid in equilibrium with the nitrogen oxides, for example $Fe^{2+}$ compounds or sulfur compounds having a low oxidation number, it is important to bear in mind that the redox potential first increases to a maximum value of $+850\pm30$ mV through the addition of hydrogen peroxide; it is only after this maximum has been exceeded and the redox potential reduced to $+650\pm10$ mV that the nitrite is completely degraded to values below 1 mg $NO_2^-/l$. In one preferred embodiment of the process according to the present invention, the solutions characterized above are treated with hydrogen peroxide in two stages. In the first stage, addition of the $H_2O_2$ is terminated on reaching a potential of around $+850\pm30$ mV; in the second stage, it is terminated after the potential has fallen to $+650\pm10$ mV. In this two-stage process, therefore, addition of the $H_2O_2$ is controlled first in the "oxidizing agent addition" direction and then in the "reducing agent addition" direction.

Major advantages of the process according to the invention are:

The nitrite content can be reliably reduced to values below 1 mg/l.

Solutions containing other oxidizable ingredients can also be treated.

Simple control for the treatment of continuous wastewater streams of varying composition.

Hardly any excess of hydrogen peroxide is necessary. Accordingly, problems which could be caused by an excessive residual $H_2O_2$ content, for example reoxidation of $Cr^{3+}$ to $CrO_4^-$ after alkalization of the solution freed from nitrite or the formation of floating sludge from Fe $(OH)_3$ charged with $O_2$ ($O_2$ from the decomposition of $H_2O_2$), do not arise.

Complete avoidance of $NO_x$ emission in the treatment of pickling acids.

The invention is illustrated by the following Examples:

EXAMPLE 1

A spent pickling acid (4 l) based on an aqueous solution containing $HNO_3$ and HF which contained 2,500 mg $NO_2^-/l$ and 850 mg $Fe^{++}/l$ in addition to other compounds was not changed in its pH value. An initial potential of $+700$ mV was measured with a pair of platinum/calomel electrodes. 50% by weight aqueous $H_2O_2$ solution was then slowly added dropwise from a burette. The redox potential rose to $+870$ mV and then fell to $+840$ mV. A sample of the acid thus treated was back-neutralized to pH 6.5 and analyzed for nitrite. The nitrite content was 400 mg $NO_2^-/l$. Accordingly, nitrite is still present at the highest redox potential. $H_2O_2$ was then added dropwise to the acid until the potential had fallen from $+840$ mV to $+650$ mV. A sample of the acid was again back-neutralized to pH 6.5. The nitrite content had fallen to below 1 mg $NO_2^-/l$; the $H_2O_2$ excess was 10 mg $H_2O_2/l$.

EXAMPLE 2

A wastewater stream occuring in a quantity varying from 2 to 4 $m^3/h$ and containing 200 to 800 mg $NO_2^-/l$ was adjusted to a pH value of 2.5. By measurement of the redox potential with a pair of platinum/calomel electrodes, a metering pump was then actuated via an automatic controller so that $H_2O_2$ was continuously and automatically introduced into the tank reactor in such a quantity that a redox potential of $+650\pm10$ mV was maintained in the tank reactor. The nitrite content was always below 1 mg $NO_2^-/l$. The $H_2O_2$ excess was at most 2 mg $H_2O_2/l$.

EXAMPLE 3

A measuring stream, of 100 l/h was removed from a wastewater stream occuring in quantities varying from 80 to 150 $m^3/h$ with nitrite contents of 15 to 170 mg $NO_2^-/l$ and iron contents of 5 to 25 mg $Fe^{++}/l$ and with a pH value of 2 to 3 as it flowed into the tank reactor; a pH value of 2.5±0.2 was adjusted therein.

By measurement of the redox potential with a pair of platinum/calomel electrodes in the conditioned measuring stream, a metering pump was actuated via an automatic controller so that 50% by weight aqueous hydrogen peroxide solution was automatically and continuously introduced—with an increase in the redox potential—into the inflow pipe upstream from the point of removal of the measuring stream in such a quantity that a redox potential of 830±20 mV was maintained in the inflow to the tank reactor. A second measuring stream was continuously removed from the tank reactor itself and adjusted to pH value of 2.5±0.2. By measurement of the redox potential in this second pH-conditioned measuring stream using a pair of platinum/calomel electrodes, a second metering pump was actuated via an automatic controller to pump 50% by weight $H_2O_2$ solution into the tank reactor. $H_2O_2$ was introduced into the tank reactor—with reduction of the redox potential—in such a quantity that a redox potential of $+650\pm10$ mV was maintained in the tank reactor. The nitrite content in the effluent from the tank reactor was consistently reduced to values below 1 mg $NO_2^-/l$ over a test period of three months. The $H_2O_2$ excess in the effluent was at most 2 mg $H_2O_2/l$.

Further variations and modifications of the invention will become apparent to those skilled in the art from the foregoing and are intended to be encompassed by the claims appended hereto.

German Priority Application P 41 27 980.8, filed on Aug. 23, 1991, is relied on and incorporated by reference.

What is claimed is:

1. A process for the automatic controllable reduction of the nitrite content of a nitrite-containing aqueous solution, said process comprising adding hydrogen peroxide continuously or in stages to said solution until the redox potential of said solution is at a maximum value and thereafter continuing to add hydrogen peroxide to further reduce the nitrite content to a value below 1 mg $NO_2^-/l$, wherein the pH of said solution is held below 3.5, continuously measuring said redox potential of said solution, and terminating said addition of hydrogen peroxide when said redox potential is lowered to a value of 650±10 mV.

2. The process according to claim 1, wherein said redox potential is about 850 mV before said redox potential is lowered to a value of 650±10 mV.

3. The process according to claim 1, wherein said nitrite-containing aqueous solution contains other ingredients oxidizable by hydrogen peroxide.

4. A process for the automatic controllable reduction of the nitrite content of a nitrite-containing aqueous solution to a value below 1 mg $NO_2^-/l$, said process comprising adding hydrogen peroxide to said solution and continuously measuring the redox potential of said solution, wherein said solution has a pH value below 3.5, wherein said hydrogen peroxide is added in two stages wherein the addition of $H_2O_2$ in the first stage is terminated after said redox potential has risen to a value of about 850±30 mV and the addition of $H_2O_2$ in the second stage is terminated after said redox potential has fallen to 650±10 mV.

5. The process according to claim 1, wherein said continuous measuring of said redox potential occurs at a pH value of 2.5±0.2.

6. The process according to claim 1, wherein said solution is a pickling acid containing nitric acid.

7. The process according to claim 1, wherein said continuous measuring of said redox potential is accomplished by a pair of noble metal/calomel electrodes.

8. The process according to claim 1, wherein said hydrogen peroxide is an aqueous solution of 30 to 70% by weight hydrogen peroxide.

9. A process for the automatic controllable reduction of the nitrite content of a nitrite-containing aqueous solution to a value below 1 mg $NO_2^-/l$, said process comprising adding hydrogen peroxide continuously or in stages to said solution in a reactor, wherein a measuring stream is continuously branched off from said reactor and the redox potential is determined in said measuring stream at a pH value maintained at 2.5±0.2 while a pH value below 3.5 is adjusted in said reactor, and said addition of hydrogen peroxide is terminated when said redox potential is lowered to a value of 650±10 mV.

* * * * *